H. E. MARSHALL & R. ISAKSEN.
POWER TRANSMISSION MECHANISM.
APPLICATION FILED JUNE 8, 1911.

1,023,262.

Patented Apr. 16, 1912.
4 SHEETS—SHEET 3.

Witnesses:
Victor D. Borst
Wm. Ashley Kelly

Inventors:
Herbert E. Marshall
Robert Isaksen
by Henry D. Williams
Attorney.

H. E. MARSHALL & R. ISAKSEN.
POWER TRANSMISSION MECHANISM.
APPLICATION FILED JUNE 8, 1911.
1,023,262.
Patented Apr. 16, 1912.
4 SHEETS—SHEET 4.
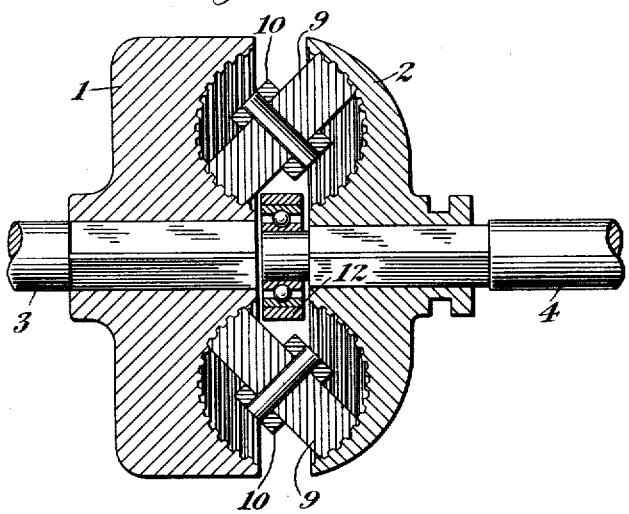
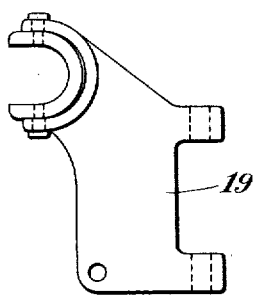
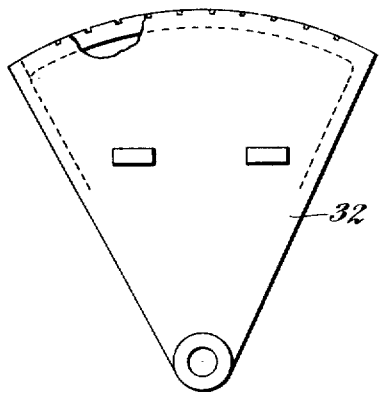
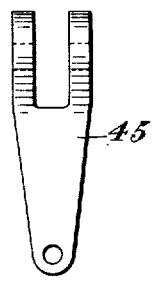
Witnesses:
Inventors:
Herbert E. Marshall
Robert Isaksen
by Henry D. Williams
Attorney.

UNITED STATES PATENT OFFICE.

HERBERT E. MARSHALL AND ROBERT ISAKSEN, OF BROOKLYN, NEW YORK.

POWER-TRANSMISSION MECHANISM.

1,023,262. Specification of Letters Patent. Patented Apr. 16, 1912.

Application filed June 8, 1911. Serial No. 631,999.

*To all whom it may concern:*

Be it known that we, HERBERT E. MARSHALL and ROBERT ISAKSEN, citizens of the United States, both residing at the borough of Brooklyn, in the county of Kings and State of New York, have invented certain new and useful Improvements in Power-Transmission Mechanism, of which the following is a specification, reference being had therein to the accompanying drawings, forming part thereof.

Our invention relates to power transmission mechanism and is particularly adapted for use in motor vehicles.

One of the objects of our invention is to provide a simple, durable and reliable transmission mechanism, by means of which the relative speed imparted to the driven parts may easily be varied, and by means of which a considerable number of small changes in relative speeds may be effected.

Another object of our invention is to provide simple and effective means for reversing the direction in which motion is imparted to the driven parts.

Other objects are economy in construction and maintenance, convenience in operation, and simplicity and compactness of structure.

Still other objects and advantages of our invention will appear from the following description.

In its preferred embodiment our invention comprehends a friction transmission mechanism including two friction elements, each having a friction surface oppositely disposed to that of its complementary friction element, and an intermediate friction disk interposed between the two friction elements in peripheral contact therewith and arranged to be angularly adjusted. The friction surfaces of the friction elements and the periphery of the disk are provided with teeth extending in the direction of relative movement of the surfaces, so that the friction grip of these surfaces is increased and they are held locked in any position of adjustment so long as the teeth are maintained in intermeshed or engaged position.

Our invention also comprehends various combinations and arrangements of parts, as will hereinafter more fully appear.

We shall now describe the embodiment of our invention illustrated in the accompanying drawings, and shall thereafter point out our invention in claims.

Figure 1:
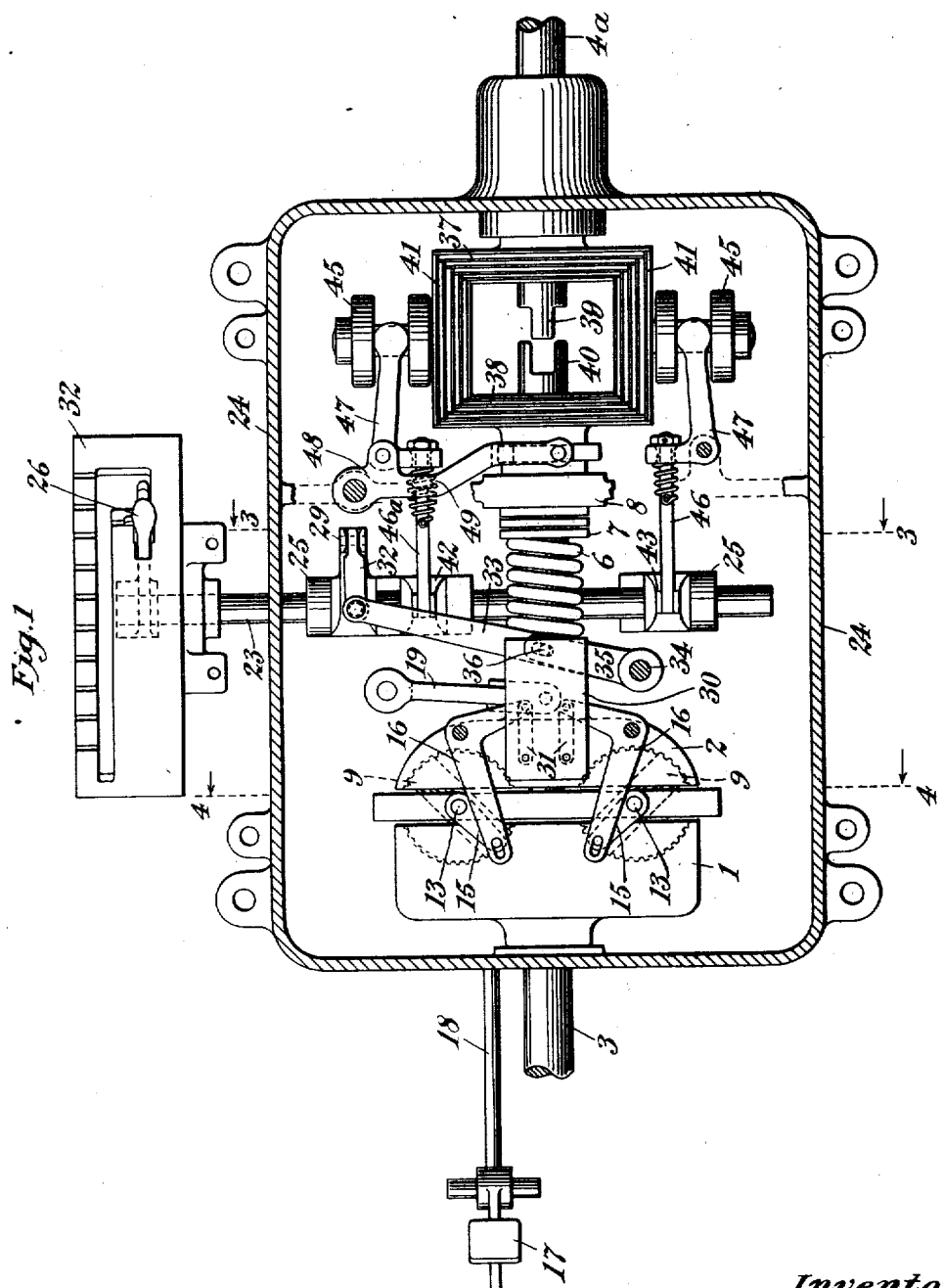
Figure 2:
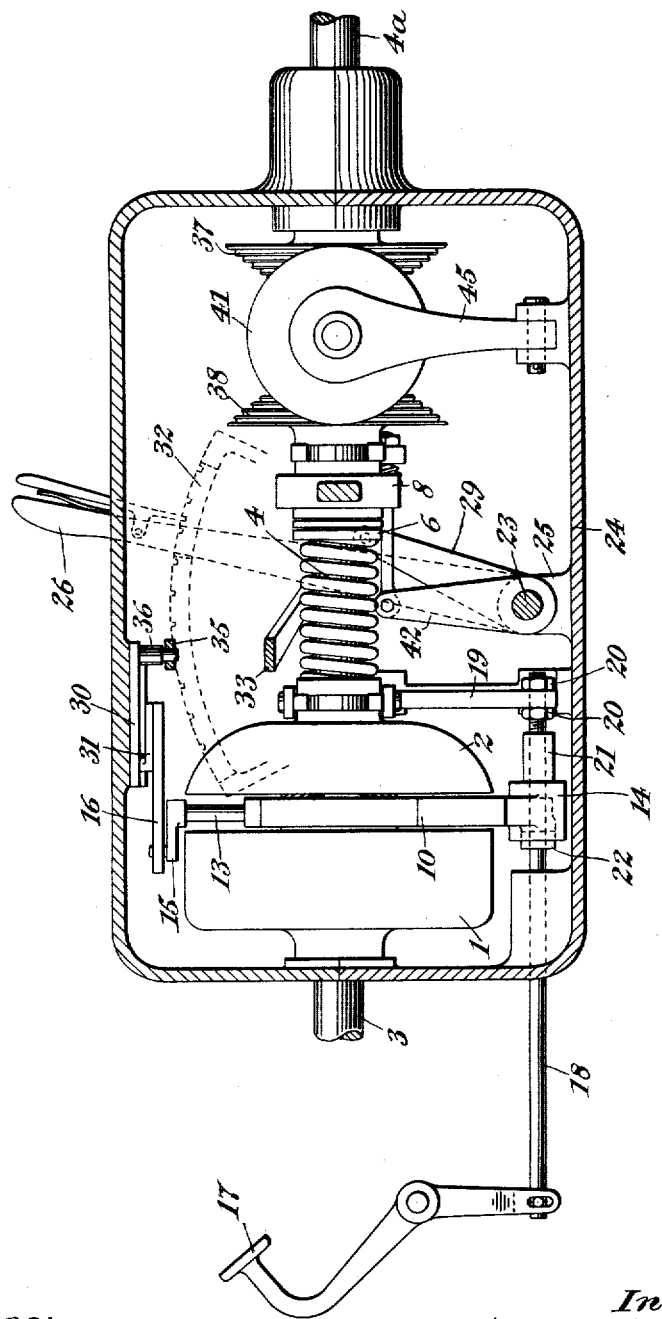
Figure 3:
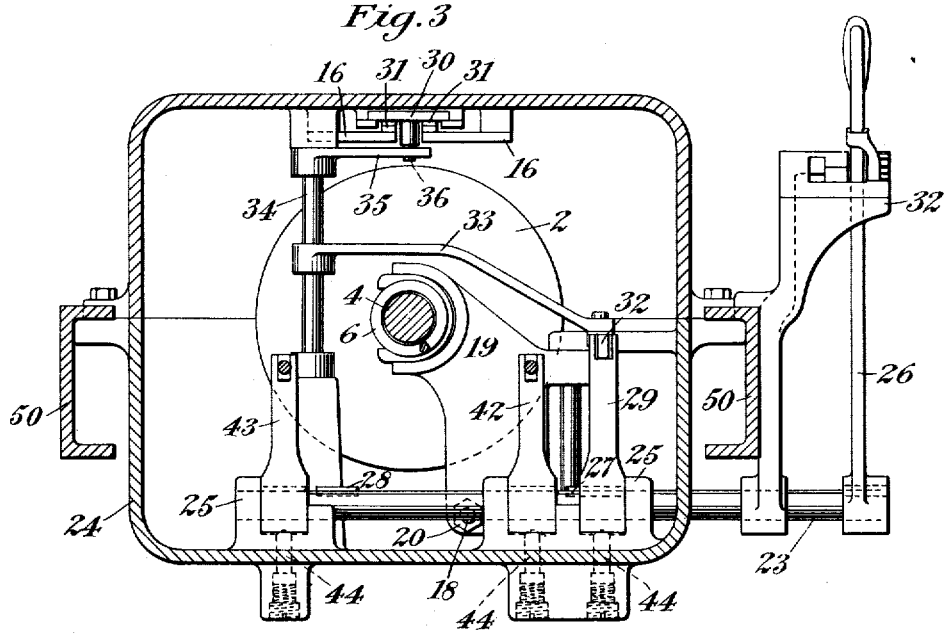
Figure 4:
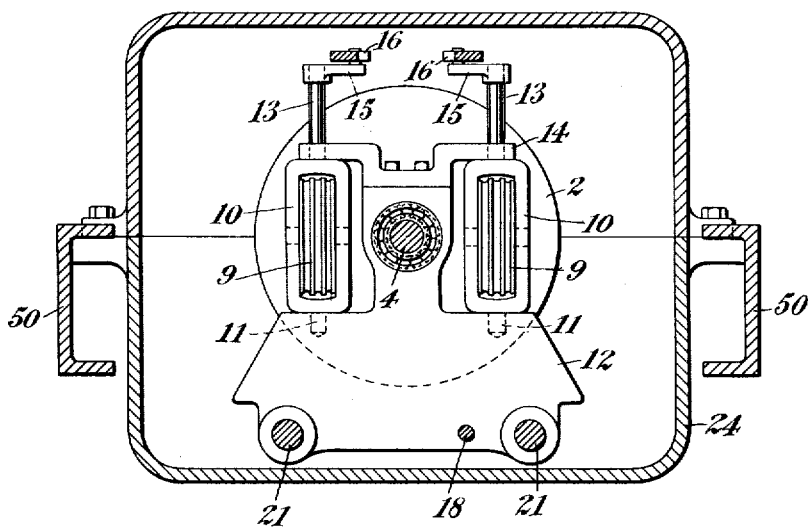

Figure 1 is a plan view of a transmitting mechanism embodying our invention. Fig. 2 is a side elevation of the same. Fig. 3 is a vertical section of the same taken on the line 3—3 of Fig. 1 looking toward the left. Fig. 4 is a similar view taken on the line 4—4 of Fig. 1. Fig. 5 is a central horizontal sectional detail on an enlarged scale of the transmission head. Fig. 6 is a detail side elevation of the sector for the controlling lever. Fig. 7 is a detail side elevation of the adjusting lever for the slidable friction head. Fig. 8 is a detail end elevation of one of the swinging supports for the intermediate cone pulleys in the reversing mechanism.

In the illustrated embodiment of our invention, showing the adaptation thereof to a motor vehicle, we employ a transmission head including a friction driving head 1 and a complementary coöperating friction driven head 2, the former fixed on the engine shaft 3, which we term the drive shaft, and the latter slidably mounted on the squared end of a driven shaft 4 arranged in alinement with the engine shaft. The sliding movement of the driven head 2 is limited by a shoulder on the driven shaft 4 at the end of the squared portion, as shown in Fig. 5, and a coiled thrust clutch spring 6, which surrounds the shaft 4, bears at its rear end against a usual thrust ball bearing 7, interposed between the rear end of the spring and the stationary shaft support 8, and the clutch spring bears at its front end against a neck or boss on the driven head 2 and tends to force the driven head toward its complementary driving head.

The opposing faces of the friction heads 1 and 2 are provided with registering annular concave friction faces concentric with the axes of the friction heads. To transmit rotation from the driving to the driven head we employ a plurality of rotary friction transmitting pulleys or disks 9 (shown as two), arranged to frictionally engage the friction faces at their respective peripheries. These transmission disks are mounted for rotation in swinging frames 10 which are pivoted on vertical axes to permit the disks to be turned angularly to change their arcs of engagement with the two friction surfaces.

To augment the frictional adhesion or grip between the transmission disks and the friction faces, each friction face is provided with a plurality of annular teeth concentric with the friction faces, and the disks are provided with circumferential teeth adapted to mesh with those of the friction faces. These teeth are tapered or beveled off at their outer edges so that they will retain the same relative shape as they wear off.

The frames 10 (see Fig. 4) are pivoted on vertical axes, each frame being provided at its bottom with a short trunnion 11 which bears in a carrier or base 12, and at its top with longer trunnions 13, which longer trunnions extend up through bearings provided for them in oppositely extending arms of a bracket 14 secured by bolts to the top of a central upward extension on the base 12. This central upward extension serves as the front bearing for the driven shaft 4, ball bearings being provided, as shown in Fig. 4. To swing the frames 10 on their vertical axes and thus similarly adjust the angular disposition of the transmission disks 9, crank arms 15 are fixed on the upper end of the trunnions 13 and to these crank arms are operatively connected bell-crank levers 16, which are manually operated through means which will be described hereinafter.

It is apparent that the angular disposition of the transmission disks 9 cannot be adjusted until after the coöperating members have been separated and the teeth no longer mesh, and to thus separate the members, we provide means operated by the treadle 17 to successively move the driven head 2 away from the transmission disks, and the transmission disks out of mesh with the driving head 1. The treadle 17, through a bell-crank lever, operates a slide-rod 18, which passes loosely through a bore in the base 12 of the transmission disks, and at its inner end passes through an elongated bore in the free side of a pivoted adjusting lever 19 for the slidable driven head 2. Nuts 20 on the slide-rod 18, one on each side of the adjusting lever 19, serve to operatively connect the slide-rod to the adjusting lever, while the elongated opening in the lever, through which the slide-rod passes, permits the pivotal movement of the lever. The adjusting lever 19 is of an irregular shape and is pivoted on a vertical axis and has a bifurcated part opposite its pivoted side which straddles a groove 20 in the neck of the driven head 2, being attached thereto by set-screws. The base 12 is slidably mounted on two guide-rods 21, and the slide-rod 18 carries a nut 22 in front of the base 12 and slightly removed from the base when the treadle is elevated and the parts are in operative position. It is now apparent that when the treadle is depressed, the slide-rod 18, acting through the lever 19, immediately starts to slide the driven head 2 back against the tension of the spring 6, and as soon as the teeth on the friction face of the driven head are moved out of mesh with those on the transmission disks, the nut 22 engages the base 14 and thereafter slides the base and transmission disks along with the driven head 2 until the neck of the driven head strikes the shoulder on the shaft 4 at the end of the squared portion, the parts being so designed that at this point the teeth of the transmission disks are out of mesh with those of the friction face of the driving head 1. The friction disks are now free to be angularly adjusted, and the means for accomplishing this adjustment will now be described.

It will readily be understood that the speed of rotation imparted to the driven head depends upon the radial position occupied by the disks 9, since the peripheral speed imparted to these disks depends upon the zone of contact with the friction face of the driving head 1, being least when this contact zone is nearest the axis of the driving head, as shown in the drawings, and greatest when this contact zone is farthest from the axis of the driving head, or substantially 90° from the position shown in the drawings. Similarly a given peripheral speed of the disks will transmit the slowest speed of rotation to the driven head when the disks contact with the outer edge of the friction surface and will transmit the fastest speed when they contact with the inner edge of the friction surface. Between these two extreme positions are several intermediate positions corresponding with the number of intermediate teeth, since the disks may be moved one tooth at a time, and the teeth thus perform the additional function of serving to positively define the units of adjustment. To manually operate the bell-crank levers 16 and angularly adjust the transmission disks 9, a rock-shaft 23, running transversely of the frame or case 24, is journaled in bearings 25 extending up from the bottom of the case, and has fixed on its outer end which projects through the case 25 a hand lever 26, disposed at the right side of the vehicle in the usual position. The rock-shaft 23 is longitudinally slidable in its bearings and is provided with two keys 27 and 28, the former of which in the position of the shaft shown in Fig. 3 engages in a keyway in an upwardly extending speed-controlling lever 29. This lever 29 has a hub encircling the rock-shaft 23, and when engaged by the key 27, it is secured to the rock-shaft and oscillated thereby.

The rear ends of the bell-crank levers 16 are secured to a slidable plate 30 through intermediate links 31, and this slidable plate 30 is operated by the speed-controlling lever 29 through connections consisting of a short link 32, a lever 33 extending obliquely and transversely across the case 24 and pivoted at its opposite end to a vertical pivot 34 journaled in bosses at the top and bottom of the case, and a short backwardly extending link 35 fixed on the upper end of the pivot 34, the link 35 having a slot at its free end into which extends a pin 36 on the under side of the plate 30. It is apparent that as the shaft 23 is rocked, the plate 30 will be caused to slide backward and forward through the connections just described, and the transmission disks 9 will be accordingly angularly adjusted. A sector 32 in which the lever 26 is guided and which is attached to the side of the frame 24, is provided with a number of notches corresponding to the number of intermediate teeth in the friction faces of the rotary heads 1 and 2, and these notches are engaged by the usual spring-pressed catch and are formed at such intervals that a movement of the spring-pressed catch from one notch to another moves the transmission disks one tooth. It is manifest that the thrust spring 6 tends to hold the parts of the transmission head in operative contact and also to hold the treadle 17 elevated.

At the rear end of the case 24 the driven shaft 4 is split and a reversing mechanism interposed which will now be described. In describing this mechanism I shall refer to the shaft 4 as the driving shaft and the continuation of this shaft 4ª at the rear of the reversing mechanism as the driven shaft. Fixed on the shaft 4ª at its front end is a friction bevel pulley 37 and splined on the adjacent end of the shaft 4 is a similar coöperating pulley 38. The pulley 37 carries a tongued projection 39 adapted to fit into a grooved projection 40 carried by the complementary pulley 38 when the two pulleys are in proximity. In this position, therefore, the pulleys are interlocked and rotation is transmitted directly from the driving to the driven shaft. When the pulley 38 is moved back on the shaft 4 out of interlocking position, direct connection between the two pulleys is eliminated, and intermediate friction pulleys 41 are inserted which serve to reverse the direction of rotation of the driven shaft 4ª. To slide the pulley 38 out of interlocking position and at the same time to move the intermediate pulleys 41 into operative position, as shown in Fig. 1, operating means are provided connected with and operated by the rock-shaft 23, and these operating means will now be described.

Two upwardly extending reversing levers 42 and 43, similar in all respects to the speed-controlling lever 29 except that they are somewhat shorter, have hubs encircling the rock-shaft 23 and these hubs are provided with keyways which are engaged by the keys 27 and 28, respectively, when the shaft 23 is moved longitudinally over to reversing position, as shown in Fig. 1. The sector 32 is provided with a transverse slot at its rear end which connects with a reversing slot on the inner side of the sector. The lever 26 must, therefore, be pulled back to its extreme rear position in order to enter the transverse slot to slide the rock-shaft 23 over to reversing position, or, in other words, the vehicle must be on slow speed before it can be reversed. When the rock-shaft is moved longitudinally over to reversing position, from the position shown in Fig. 3 to that shown in Fig. 1, the key 27 is disengaged from the speed-controlling lever 29 and engages the reversing lever 42, while, at the same time, the key 28 engages the reversing lever 43 and the reversing levers 42 and 43 are locked to the shaft. The reversing and speed-controlling levers bear with their sides between vertically extending bearings of the rock-shaft, and spring-pressed detents 44 are arranged to snap into sockets in the bottom of the levers to hold them when released by the rock-shaft so that they will be in proper position for their respective keys to enter their keyways when the rock-shaft is moved longitudinally to lock them on the shaft.

The intermediate pulleys 41 are journaled in the upper ends of swinging bearings 45 which are pivoted at their lower ends in bosses or lugs on the bottom of the case. The upper ends of the swinging bearings 45 are bifurcated and are operatively connected to the reversing levers 42 and 43 through links 46 and 46ª, respectively, and vertically pivoted bell-crank levers 47, one end of each of which bell-crank levers is inserted in the bifurcated end of the respective swinging bearings 45, and the other end of each of which is joined to the respective link 46 and 46ª, which passes through a slotted opening in the arm of its bell-crank lever and is joined thereto by a nut on one side and a coiled thrust spring anchored in the link on the other side.

Since the intermediate pulleys 41 must be withdrawn before the pulley 38 can be moved toward the pulley 37, the link 46ª is split and the coiled spring is anchored to one portion of the link and tied over a knob on the end of the other portion, as shown, so that the spring acts both as a thrust and a compression spring and permits the two levers 47 and 48 to move independently.

To slide the pulley 38 backward and forward in conjunction with and at right angles to the movement of the intermediate pulleys 41, an additional vertically pivoted lever 48 is connected by a pin 49 to one of the two links 46, and the lever 48 has a bifurcated free end which straddles over a groove in the neck of the pulley 38, and slides the pulley to and from interlocking position as the lever 48 is swung on its pivot by the link 46. These parts are so designed that as the shaft 23 is rocked forward the pulley 38 is retracted and the intermediate pulleys 41 inserted, and when the shaft is rocked back the pulleys are moved in the opposite direction.

To increase the frictional grip of the intermediate pulleys 41 with the bevel faces of the pulleys 37 and 38, the engaging faces of all four pulleys are provided with similar annular teeth concentric with the axes of the respective pulleys. These teeth are similar in shape to those on the friction faces and transmission disks in the transmission mechanism.

The case 24 is inserted in the frame 50 of the vehicle in convenient position and is secured to a flange or the frame by bolts passing downward through outwardly extending lugs on the case, as shown. As usual the case may be supplied with a large quantity of lubricant so that the parts therein will run in oil.

It will be noted that our transmission mechanism performs all the essential functions of a clutch, and therefore the usual clutch may be dispensed with.

It is obvious that various modifications may be made in the construction shown and above particularly described within the principle and scope of our invention.

We claim:

1. A power transmission device comprising two friction elements having oppositely facing friction surfaces, an intermediate friction disk interposed between the two friction elements in peripheral contact with the two friction surfaces, the two friction surfaces being provided with a plurality of similar annular teeth arranged concentrically about the respective axes of the friction elements, and the intermediate disk having a plurality of circumferential teeth adapted to mesh with the teeth of the two friction surfaces, and means for adjusting the angular position of the intermediate disk.

2. A power transmission device comprising two friction elements each having an annular concave friction surface facing that of the complementary friction element, the two friction surfaces being provided with a plurality of similar annular teeth arranged concentrically with the respective annular friction surfaces, an intermediate friction disk interposed between the two friction elements and provided with a plurality of circumferential teeth adapted to mesh with the teeth of the two friction surfaces, and means for adjusting the angular position of the intermediate disk.

3. A power transmission device comprising a driving head having an annular concave friction surface concentric with its axis, a driven head having an annular concave friction surface concentric with its axis and facing that of the driving head, the two friction surfaces being provided with a plurality of similar annular teeth arranged concentrically with the respective friction surfaces, a transmission disk having a plurality of circumferential teeth adapted to mesh with the teeth of the two friction surfaces, the transmission disk being disposed between the two heads with its teeth meshing with those of both friction surfaces, and means for adjusting the angular position of the transmission disk to vary the speed of rotation imparted to the driven head.

4. A power transmission device comprising a driving head having an annular concave friction surface concentric with its axis, a driven head having an annular concave friction surface concentric with its axis and facing that of the driving head, the two friction surfaces being provided with a plurality of similar annular teeth arranged concentrically with the respective friction surfaces, a transmission disk having a plurality of circumferential teeth adapted to mesh with the teeth of the two friction surfaces, the transmission disk being disposed between the two heads with its teeth meshing with those of both friction surfaces, means for engaging and disengaging the three members by movement toward and from each other, and means for adjusting the angular position of the transmission disk to vary the speed of rotation imparted to the driven head.

5. A power transmission device comprising a driving shaft and a driving head fixed thereon having an annular concave friction surface concentric with its axis, a driven shaft and a driven head slidably mounted thereon having an annular concave friction surface concentric with its axis and facing that of the driving head, the two friction surfaces being provided with a plurality of similar annular teeth arranged concentrically with the respective friction surfaces, two transmission disks each having a plurality of circumferential teeth adapted to mesh with the teeth of the two friction surfaces, the transmission disks being disposed on opposite sides of the driving shaft between the two heads and meshing with the teeth of the friction surfaces at corresponding radii, resilient means operative to normally hold the driven head in engagement with the transmission disks, means arranged to move the driven head out of engagement with the transmission disks and to move the transmission disks out of engagement with the driving head, and manually operative means to similarly adjust the annular disposition of the two transmission disks.

6. A power transmission device comprising a driving shaft and a driving head fixed thereon having an annular concave friction surface concentric with its axis, a driven shaft and a driven head slidably mounted thereon having an annular concave friction surface concentric with its axis and facing that of the driving head, the two friction surfaces being provided with a plurality of similar teeth arranged concentrically with the respective friction surfaces, two transmission disks each having a plurality of circumferential teeth adapted to mesh with the teeth on the two friction surfaces, the transmission disks being disposed on opposite sides of the driving shaft between the two heads and meshing with the teeth of the friction surfaces at corresponding radii, a support for the transmission disks slidable toward and from the driving head, resilient means tending to hold the two heads and the transmission disks in operative engagement, means for successively moving the driven head out of engagement with the transmission disks and moving the support for the transmission disks to disengage the disks from the driving head, and manually operative means to similarly adjust the radial disposition of the two transmission disks.

7. A power transmission device comprising a driving shaft and a driving head fixed thereon having an annular concave friction surface concentric with its axis, a driven shaft and a driven head slidably mounted thereon having an annular concave friction surface concentric with its axis and facing that of the driving head, the two friction surfaces being provided with a plurality of similar annular teeth arranged concentrically with the respective friction surfaces, two transmission disks each having a plurality of circumferential teeth adapted to mesh with the teeth on the two friction surfaces, the transmission disks being disposed on opposite sides of the driving shaft between the two heads and meshing with the teeth of the friction surfaces at corresponding radii, a support for the transmission disks slidable toward and from the driving head, resilient means tending to hold the two heads and the transmission disks in operative engagement, means for successively moving the driven head out of engagement with the transmission disks and moving the support for the transmission disks to disengage the disks from the driving head, a manually operative rock-shaft, and connecting means between the rock-shaft and the transmission disks arranged to adjust the radial disposition of the transmision disks as the shaft is rocked.

8. A friction transmission device comprising a rotary driving head, and an oppositely disposed rotary driven head movable toward and away from the driving head, a friction transmission disk peripherally engaging both driving heads, a slidable carrier for the transmission disk, and manually operative means for successively moving the driven head away from the transmission disk and the transmission disk away from the driving head.

9. A friction transmission device comprising a rotary driving head and an oppositely disposed rotary driven head movable toward and away from the driving head, a friction transmission disk peripherally engaging both driving heads, a slidable carrier for the transmission disk, resilient means tending to hold the three members in contact, and manually operative means for successively moving the driven head away from the transmission disk and the transmission disk away from the driving head.

10. A friction transmission device comprising a rotary driving head having an annular concave friction surface, an oppositely disposed driving head movable toward and away from the driving head and having a friction surface similar to and registering with that of the driving head, the two friction surfaces being provided with a plurality of annular teeth arranged concentrically with the respective friction surfaces, a friction transmission disk provided with circumferential teeth adapted to mesh with the teeth of the two friction surfaces, the transmission disk being disposed between the two heads with its teeth meshing with those of the two friction surfaces, a slidable carrier for the transmission disk, resilient means tending to hold the three members in contact, and manually operative means for successively moving the driven head away from the transmission disk and the transmission disk away from the driving head.

11. A friction transmission device comprising a rotary driving head having an annular concave friction surface, an oppositely disposed driving head movable toward and away from the driving head and having a friction surface similar to and registering with that of the driving head, the two friction surfaces being provided with a plurality of annular teeth arranged concentrically with the respective friction surfaces, a plurality of friction transmission disks provided with circumferential teeth adapted to mesh with the teeth of the two friction surfaces, the two transmission disks being disposed at corresponding radii between the two heads with their teeth meshing with those of the two friction surfaces, a slidable carrier for the transmission disks, resilient means tending to hold the three members in contact, manually operative means for successively moving the driven head away from the transmission disks and the transmission disks away from the driving head, and manually operative means for similarly adjusting the radial disposition of the transmission disks.

12. A friction transmission mechanism comprising a pair of oppositely disposed rotary heads each having a friction surface, one of the heads being slidably mounted for movement toward and away from its complementary head, a rotary friction transmission disk disposed in frictional engagement with the two friction surfaces and held against bodily circular movement about the axes of the rotary heads, means for successively moving the slidable head out of engagement with the transmission disk and the transmission disk out of engagement with the stationary head, and means for adjusting the angular disposition of the transmission disk to vary the speed of rotation transmitted thereby.

13. A friction transmission mechanism comprising a pair of oppositely disposed rotary heads each having a friction surface, one of the heads being slidably mounted for movement toward and away from its complementary head, a rotary friction transmission disk disposed in frictional engagement with the two friction surfaces and held against bodily circular movement about the axes of the rotary heads, resilient means normally holding the slidable head with its friction surface in engagement with the transmission disk, manually operative means for successively moving the slidable head against the tension of the resilient means away from the transmission disk and the transmission disk out of engagement with the stationary head, and means for adjusting the angular disposition of the transmission disk to vary the speed of rotation transmitted thereby.

14. A friction transmission mechanism comprising a pair of oppositely disposed rotary elements each having an annular concave friction surface provided with annular teeth, one of the heads being slidably mounted, a rotary friction transmission disk having circumferential teeth and disposed with its teeth meshing in those of the friction surfaces, a carrier for the transmission disk mounted for sliding movement and held against bodily circular movement about the axes of the rotary elements, resilient means normally holding the two heads and transmission wheel in engagement, manually operative means for successively moving the slidable head away from the transmission disk and the transmission disk away from the non-slidable head, thereby separating the three elements, and means for adjusting the angular disposition of the transmission disk to vary the speed of rotation transmitted thereby.

15. A power transmission device comprising a pair of oppositely disposed rotary heads each having a friction surface, a transmission disk disposed in frictional engagement with the two friction surfaces and arranged to transmit rotation from one rotary head to the other; a reversing mechanism comprising a driving and a driven friction pulley arranged to interlock and rotate together in the same direction when in proximity to each other, one of the pulleys being slidable toward and away from its complementary pulley, and an intermediate friction pulley arranged to engage with the two pulleys and reverse the direction of rotation of the driven pulley; a rock shaft, and means connecting the rock shaft with the transmission disk, the intermediate pulley and the slidable pulley to adjust the radial disposition of the transmission disk between the two friction surfaces and to move the slidable pulley into and out of interlocking engagement with its complementary pulley and to move the intermediate pulley into and out of reversing position as the shaft is rocked.

16. A power transmission device comprising a pair of oppositely disposed rotary heads each having a friction surface, a transmission disk disposed in frictional engagement with the two friction surfaces and arranged to transmit rotation from one rotary head to the other; a reversing mechanism comprising a driving and a driven friction pulley arranged to interlock and rotate together in the same direction when in proximity to each other, one of the pulleys being slidable toward and away from its complementary pulley, and an intermediate friction pulley arranged to engage with the two pulleys and reverse the direction of rotation of the driven pulley, the pulleys being provided with annular concentric teeth arranged so that the teeth on the intermediate pulley mesh with those on the other two pulleys in reversing position and increase the frictional grip; a rock shaft, and means connecting the rock shaft with the transmission disk, the intermediate pulley and the slidable pulley to adjust the radial disposition of the transmission disk between the two friction surfaces and to move the slidable pulley into and out of interlocking engagement with its complementary pulley and to move the intermediate pulley into and out of reversing position as the shaft is rocked.

17. A power transmission device comprising a pair of oppositely disposed rotary heads each having a friction surface, a transmission disk disposed in frictional engagement with the two friction surfaces and arranged to transmit rotation from one rotary head to the other; a reversing mechanism comprising a driving and a driven friction pulley arranged to interlock and rotate together in the same direction when in proximity to each other, one of the pulleys being slidable toward and away from its complementary pulley, and an intermediate friction pulley arranged to engage with the two pulleys and reverse the direction of rotation of the driven pulley; a longitudinally slidable rock shaft, means arranged to connect the transmission-disk with the rock shaft when the rock shaft is in one position of longitudinal adjustment and to adjust the radial disposition of the transmission disk between the two friction surfaces as the shaft is rocked, and means arranged to connect the intermediate pulley and the slidable pulley with the rock shaft when the rock shaft is in another position of longitudinal adjustment and to successively move the slidable pulley out of interlocking connection with its complementary pulley and to move the intermediate pulley into reversing position as the shaft is rocked in one direction and to reverse the movement of the slidable and intermediate pulleys as the shaft is rocked in the opposite direction.

18. A power transmission device comprising a pair of oppositely disposed rotary heads each having a friction surface, a transmission disk disposed in friction engagement with the two friction surfaces and arranged to transmit rotation from one rotary head to the other; a reversing mechanism comprising a driving and a driven friction pulley arranged to interlock and rotate together in the same direction when in proximity to each other, one of the pulleys being slidable toward and away from its complementary pulley, and an intermediate friction pulley arranged to engage with the two pulleys and reverse the direction of rotation of the driven pulley, the pulleys being provided with annular concentric teeth arranged so that the teeth on the intermediate pulley mesh with those on the other two pulleys in reversing position and increase the frictional grip, a longitudinally slidable rock shaft, means arranged to connect the transmission disk with the rock shaft when the rock shaft is in one position of longitudinal adjustment and to adjust the radial disposition of the transmission disk between the two friction surfaces as the shaft is rocked, and means arranged to connect the intermediate pulley and the slidable pulley with the rock shaft when the rock shaft is in another position of longitudinal adjustment and to successively move the slidable pulley out of interlocking connection with its complementary pulley and to move the intermediate pulley into reversing position as the shaft is rocked in one direction and to reverse the movement of the slidable and intermediate pulleys as the shaft is rocked in the opposite direction.

In testimony whereof we have affixed our signatures in presence of two witnesses.

HERBERT E. MARSHALL.
ROBERT ISAKSEN.

Witnesses:
  VICTOR D. BORST,
  BERNARD COWEN.

---

Copies of this patent may be obtained for five cents each, by addressing the "Commissioner of Patents, Washington, D. C."